United States Patent
Lam (10) Patent No.: US 8,119,962 B2
(45) Date of Patent: Feb. 21, 2012

(54) CONTROL SIGNAL GENERATION OF A SOLAR PANEL ORIENTATION SYSTEM WITH INTERFERENCE REDUCTION USING AN INFRARED FILTER

(76) Inventor: Chin Keong Lam, San Jose, CA (US)

( * ) Notice: Subject to any disclaimer, the term of this patent is extended or adjusted under 35 U.S.C. 154(b) by 350 days.

(21) Appl. No.: 12/571,500

(22) Filed: Oct. 1, 2009

(65) Prior Publication Data

US 2011/0079213 A1  Apr. 7, 2011

Related U.S. Application Data

(60) Provisional application No. 61/195,067, filed on Oct. 3, 2008.

(51) Int. Cl.
G01C 21/02 (2006.01)
(52) U.S. Cl. ................. 250/203.4; 250/221
(58) Field of Classification Search .......... 250/203.4, 250/221, 214 R, 239, 214.1, 372, 338.1, 338.3; 126/573–578, 600–617, 685–690; 136/246; 244/164–171, 158 R; 701/207–222
See application file for complete search history.

(56) References Cited

U.S. PATENT DOCUMENTS

| | | |
|---|---|---|
| 3,861,379 A | 1/1975 | Anderson, Jr. |
| 3,976,508 A | 8/1976 | Mlavsky |
| 4,013,885 A | 3/1977 | Blitz |
| 4,027,651 A | 6/1977 | Robbins |
| 4,107,521 A | 8/1978 | Winders |
| 4,167,936 A | 9/1979 | Hackworth |
| 4,172,739 A | 10/1979 | Tassen |
| 4,175,391 A | 11/1979 | Baer |
| 4,179,612 A | 12/1979 | Smith |
| 4,202,321 A | 5/1980 | Voina |
| 4,215,410 A | 7/1980 | Wenslow |
| 4,225,781 A | 9/1980 | Hammons |
| 4,262,195 A | 4/1981 | White |
| 4,262,654 A | 4/1981 | Ward |
| 4,274,394 A | 6/1981 | Stromberg |
| 4,305,380 A | 12/1981 | Allen |
| 4,320,288 A | 3/1982 | Schlarlack |
| 4,325,788 A | 4/1982 | Snyder |
| RE30,961 E | 6/1982 | Robbins |
| 4,332,240 A | 6/1982 | Ward |
| 4,349,733 A | 9/1982 | Beam |
| 4,368,962 A | 1/1983 | Hultberg |
| 4,387,702 A | 6/1983 | Murphy |

(Continued)

OTHER PUBLICATIONS http://www.redrok.com/led3xassm.htm#Ied3xc3, Johnson, Dwayne C., Minnesota, USA, Oct. 23, 2011.

*Primary Examiner* — Que T Le
(74) *Attorney, Agent, or Firm* — Albert Wu (57) ABSTRACT

Disclosed are a system and methods of control signal generation of a solar panel orientation system with interference reduction using an infrared filter. In one embodiment, a solar panel orientation system includes a sensor that generates a control signal component when the sensor receives an ultraviolet part of a radiation signal. The system further includes an additional sensor coupled to the sensor that generates an additional control signal component when the additional sensor receives an additional ultraviolet part of the radiation signal. The control signal component and the additional control signal component each include one or more of a voltage and a current. In addition, the system includes an infrared filter that reduces an interference caused by an infrared part of the radiation signal.

20 Claims, 10 Drawing Sheets

U.S. PATENT DOCUMENTS

| | | |
|---|---|---|
| 4,476,854 A | 10/1984 | Baer |
| 4,549,078 A * | 10/1985 | Monahan .................. 250/203.1 |
| 4,649,899 A | 3/1987 | Moore |
| 4,883,340 A | 11/1989 | Dominguez |
| 5,317,145 A | 5/1994 | Corio |
| 5,600,124 A | 2/1997 | Berger |
| 5,622,078 A | 4/1997 | Mattson |
| 5,730,117 A | 3/1998 | Berger |
| 5,798,517 A | 8/1998 | Berger |
| 6,058,930 A | 5/2000 | Shingleton |
| 6,239,353 B1 | 5/2001 | Hall |
| 6,410,940 B1 | 6/2002 | Jiang et al. |
| 2006/0185713 A1 | 8/2006 | Mook, Jr. |
| 2007/0074753 A1 | 4/2007 | Altali et al. |

\* cited by examiner

CONTROL SIGNAL GENERATION OF A SOLAR PANEL ORIENTATION SYSTEM WITH INTERFERENCE REDUCTION USING AN INFRARED FILTER

CLAIM OF PRIORITY

This application claims the priority benefit under 35 U.S.C. §119(e) of Provisional Application Ser. No. 61/195,067, filed on Oct. 3, 2008. The full disclosure of this priority application is incorporated herein by reference.

FIELD OF TECHNOLOGY

This disclosure relates generally to orientation of a solar panel. More particularly, this invention relates to control signal generation of a solar panel orientation system with interference reduction using an infrared filter.

BACKGROUND

A solar panel orientation system may use radiation signals to orient a solar panel towards the sun. If a cloud passes between a solar panel and the sun, radiation from the sun may be absorbed, reflected, reemitted, or scattered by the cloud, which may interfere with the operation of a sensor used to determine the position of the sun. Radiation may also be absorbed, reflected, reemitted, diffused, or otherwise affected by solid objects and atmospheric gasses such as carbon dioxide and methane. As a result, the solar panel orientation device may fail to track the position of the sun within an acceptable tolerance range, resulting in a reduced efficiency of converting sunlight to electricity. In turn, the reduced efficiency may increase a cost of operation and a cost of the electricity provided by the solar panel. The increased costs associated with a failure to orient the solar panel may therefore result in an inefficient generation of power and a waste of resources.

SUMMARY

Disclosed are a system and methods of control signal generation of a solar panel orientation system with interference reduction using an infrared filter. In an aspect, a solar panel orientation system includes a sensor that generates a control signal component when the sensor receives an ultraviolet part of a radiation signal. The system further includes an additional sensor coupled to the sensor that generates an additional control signal component when the additional sensor receives an additional ultraviolet part of the radiation signal. The control signal component and the additional control signal component each include one or more of a voltage and a current. In addition, the system includes an infrared filter that reduces an interference caused by an infrared part of the radiation signal. The interference is reduced when the infrared part of the radiation signal is diminished by the infrared filter before the radiation signal is received by the sensor and the additional sensor.

The solar panel may be oriented towards a source of the radiation signal until the combined control signal is reduced below a threshold limit, and the threshold limit may be reached when a mounting surface of the sensor and the additional sensor is substantially perpendicular to a source of the radiation signal. The sensor and the additional sensor may each include a light emitting diode. The infrared filter may include a polyurethane dome that includes a fish eye that expands the viewing angle of the sensor shielded by the infrared filter.

In another aspect, the system includes an adjustment module that generates a motor signal based on a combined output of the control signal component and the additional control signal component. The motor signal rotates a solar panel in a direction around an axis. The system may further include a supplemental sensor and a further sensor that are coupled together. An additional combined output of the supplemental sensor and the further sensor may provide the basis of an additional motor signal that rotates the solar panel in an additional direction around the axis.

In another aspect, the system includes an additional sensor set that includes four ultraviolet sensors used to rotate the solar panel around an additional axis to orient a solar panel towards a source of the radiation signal. The additional axis is perpendicular to the axis, and the sensor, the additional sensor, the supplemental sensor, and the further sensor are each attached to a mounting surface at a predetermined angle.

The system may further include a rearward sensor that receives an additional radiation signal that is directed towards a rear surface of a solar panel. The rearward sensor may be used to orient the solar panel towards an additional source of the additional radiation signal when the rearward sensor receives the part of the additional radiation signal.

The sensor, the additional sensor, the supplemental sensor, and the further sensor may each detect ultraviolet radiation with wavelengths substantially between 390 nanometers and 400 nanometers. A sensor anode may be coupled to an additional sensor cathode and a sensor cathode may be connected to an additional sensor anode. The infrared filter may include polyurethane that is between 2.0 and 3.0 millimeters in thickness. The system may further include a vertical support of the solar panel orientation system and a horizontal support of the solar panel orientation system. The system may include a vertical axis motor enclosed within the vertical support and a horizontal axis motor enclosed within the horizontal support.

The adjustment module may include an H bridge that includes two P channel mosfets and two N channel mosfets. The H bridge rotates one or more of the horizontal axis motor and the vertical axis motor when one or more of the combined signal and the additional combined signal is received.

In another aspect, a method of a solar panel orientation system includes reducing an interference caused by an infrared part of a radiation signal when the radiation signal is altered with an infrared filter before the radiation signal is received by a sensor and an additional sensor. The method further includes generating a control signal component when the sensor receives an ultraviolet part of a radiation signal. The method also includes forming an additional control signal component when an additional sensor receives an additional ultraviolet part of the radiation signal. In addition, the method includes combining the control signal component and the additional control signal component to form a combined control signal.

The method may include orienting a solar panel towards a source of the radiation signal until the combined control signal is reduced below a threshold limit. The sensor and the additional sensor may each include a light emitting diode, and the infrared filter may include a polyurethane dome. The method may further include operating a motor based on a combined output of the control signal component and the additional control signal component. A solar panel may be rotated in a direction around an axis based on the combined output. The method may also include rotating the solar panel in an additional direction around the axis based on an additional combined output of a supplemental sensor and a further sensor.

In yet another aspect, a method of a solar panel orientation system includes coupling a sensor and an additional sensor to a solar panel orientation system. The sensor generates a control signal component when the sensor receives an ultraviolet part of a radiation signal, and the additional sensor generates an additional control signal component when the additional sensor receives an additional ultraviolet part of the radiation signal. The control signal component and the additional control signal component each include one or more of a voltage and a current.

In the aspect, the method further includes forming an infrared filter of the solar panel orientation system. The infrared filter reduces an interference caused by an infrared part of the radiation signal, and the interference is reduced when the infrared part of the radiation signal is diminished by the infrared filter before the radiation signal is received by the sensor and the additional sensor. In the aspect, the infrared filter is comprised of polyurethane between 2.0 and 3.0 millimeters in thickness.

In the aspect, the method includes placing an adjustment module in the solar panel orientation system. The adjustment module generates a motor signal based on a combined output of the control signal component and the additional control signal component, and the motor signal rotates a solar panel in a direction around an axis. The method also includes coupling a supplemental sensor and a further sensor to the solar panel orientation system. The supplemental sensor and the further sensor are coupled, and an additional combined output of the supplemental sensor and the further sensor provides the basis of an additional motor signal that rotates the solar panel in an additional direction around the axis.

The method may also include placing an additional sensor set in the solar panel orientation system. The additional sensor set may include four ultraviolet sensors that rotate the solar panel around an additional axis to orient the solar panel towards a source of the radiation signal. The additional axis may be perpendicular to the axis, and the solar panel may be oriented towards a source of the radiation signal until the combined control signal is reduced below a threshold limit. The threshold limit may be reached when a mounting surface of the sensor and the additional sensor is substantially perpendicular to a source of the radiation signal.

The method may further include coupling a rearward sensor to the solar panel orientation system. The rearward sensor may receive an additional radiation signal that is directed towards a rear surface of a solar panel. The rearward sensor may be used to orient the solar panel towards an additional source of the additional radiation signal when the rearward sensor receives the part of the additional radiation signal. The sensor, the additional sensor, the supplemental sensor, and the further sensor each detect ultraviolet radiation with wavelengths substantially between 390 nanometers and 400 nanometers.

DETAILED DESCRIPTION

Disclosed are a system and methods of control signal generation of a solar panel orientation system with interference reduction using an infrared filter.

Figure 1:
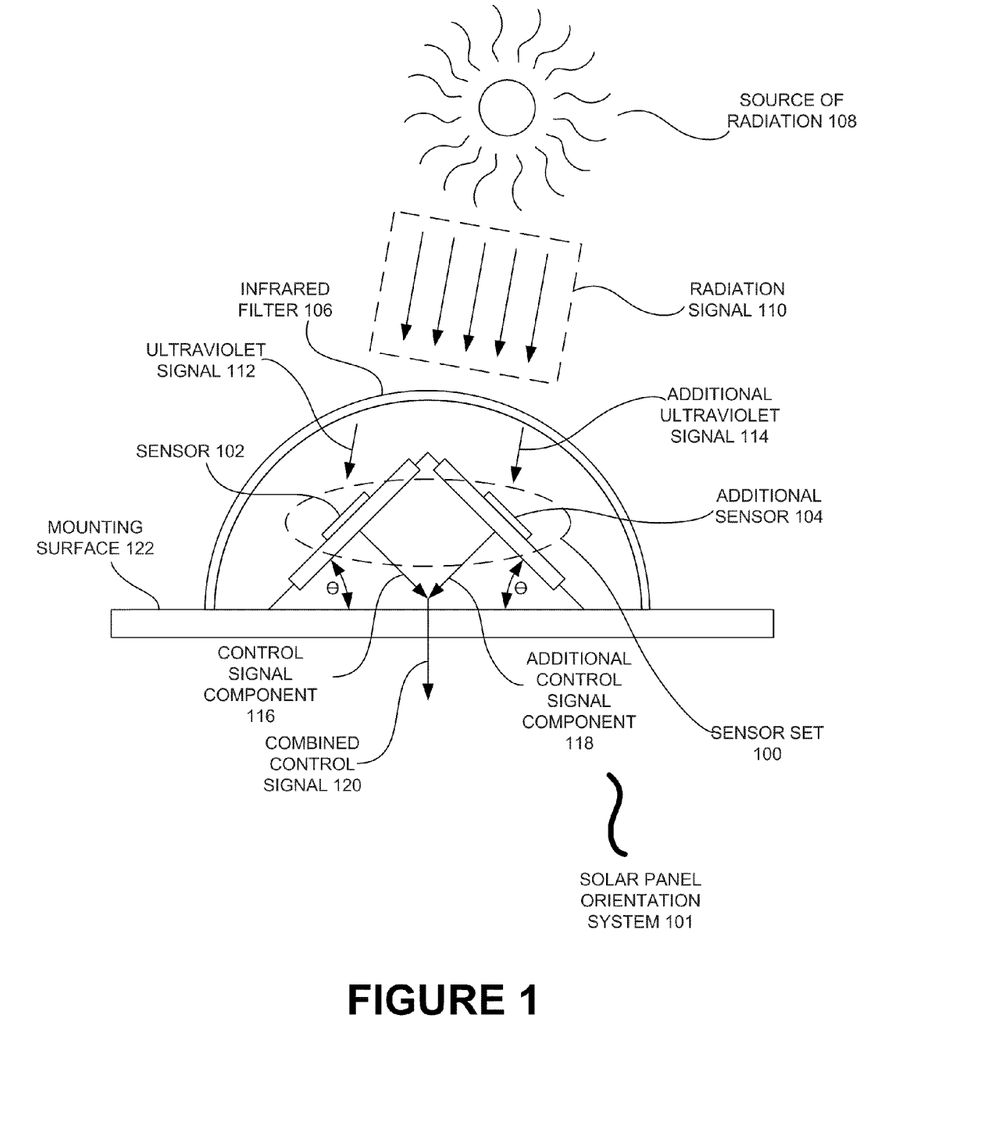
FIG. 1 illustrates reduction of an interference caused by an infrared part of a radiation signal and generation of a combined control signal, according to one embodiment.

FIG. 1 illustrates reduction of an interference caused by an infrared part of a radiation signal 110 and generation of a combined control signal 120, according to one embodiment. FIG. 1 includes a sensor set 100, a solar panel orientation system 101, a sensor 102, an additional sensor 104, an infrared filter 106, a source of radiation 108, a radiation signal 110, an ultraviolet signal 112, an additional ultraviolet signal 114, a control signal component 116, an additional control signal component 118, a combined control signal 120, and a mounting surface 122. In an embodiment, the sensor set 100 includes a sensor 102 and the additional sensor 104, each of which is attached to the mounting surface 122. Various embodiments of the solar panel orientation system 101, 301, 401, 501, and 601 are illustrated in FIGS. 1-6, and a reference to one of the embodiments of the solar panel orientation system 101 may also apply to other embodiments.

The radiation signal 110 is generated by the sun, which acts as a source of radiation 108. The radiation signal 110 may include radiation of various wavelengths, including ultraviolet and infrared radiation. The radiation signal 110 may also be generated by objects and gasses that absorb, reflect, reemit, distort, or otherwise alter the radiation signal 110.

In the embodiment, the solar panel orientation system 101 includes an infrared filter 106. The infrared filter 106 reduces an interference caused by an infrared part of the radiation signal 110, which may have been altered or affected by clouds, objects emitting infrared radiation, or atmospheric conditions that distort an infrared portion of a radiation signal 110. The infrared filter 106 reflects, absorbs, or otherwise diminishes the amount of infrared radiation that is received by the sensor 102, the additional sensor 104, or any other part of the sensor set 100.

The infrared filter 106 may be mounted to the mounting surface 122, or it may be attached to any other surface that allows it to intercept infrared radiation prior to being received by the sensor set 100. The infrared filter 106 may contact the sensors of the sensor set 100, and may be molded to fit directly against the surfaces of the sensor 102 and the additional sensor 104. The infrared filter 106 may be separated from the sensors by an air gap, a vacuum, or by other materials. The infrared filter 106 may include a fish eye half dome that enables a radiation source 108 to be visible within a 180 degree viewing angle of each sensor covered by the infrared filter 106.

In an embodiment, the distance traveled by a radiation signal 110 through the infrared filter 106 is between 2.1 and 2.9 millimeters. The infrared filter 106 may be composed of polyurethane, and it may reduce detection of infrared distortion from radiation wavelengths greater than 700 nanometers by between 60% and 85%. The infrared filter 106 may include a dome shape that reduces a distortion of incoming radiation signals 110. The infrared filter 106 may reduce incoming ultraviolet signals by less than 15%.

After the radiation signal 110 has passed through the infrared filter 106, a portion of the radiation signal 110, the ultraviolet signal 112, is received by the sensor 102. The sensor 102 then generates the control signal component 116, which may be a voltage or a current. An additional part of the radiation signal 110, the additional ultraviolet signal 114, is also received by the additional sensor 104, which then generates the additional control signal component 118 which may be a voltage or a current. The control signal component 116 and the additional control signal component 118 are then merged to form the combined control signal 120, which may be a voltage or a current.

In the embodiment, the combined control signal 120 is used to form a motor control signal that orients a solar panel towards a source of the radiation signal 110. As the solar panel orientation system, the sensor set 100, and the solar panel are oriented towards a source of radiation 108, the combined control signal 120 is reduced as the amount of radiation received by the sensor 102 and the additional sensor 104 become equivalent. Once the combined control signal 120 is reduced below a threshold limit, the movement of the solar panel and the solar panel orientation system 101 ceases.

In an embodiment, the threshold limit is reached when a mounting surface 122 of the sensor and the additional sensor 104 is substantially perpendicular. The sensor 102 and the additional sensor 104 may be attached to the mounting surface 122 at an angle Θ, which may be an angle substantially between 40 and 50 degrees. The sensor 102 and the sensor 104 may be attached to each other substantially in a straight line and oriented in opposite directions, such that the anode of the sensor may be connected directly to the cathode of the additional sensor 104.

In an embodiment, the sensor 102 and the additional sensor 104 are each an ultraviolet light emitting diode with peak wavelengths substantially between 380 nanometers and 410 nanometers. The viewing angle may be 80 degrees or less. Other characteristics of the sensor 102 and the additional sensor 104 may include a forward voltage of up to 5 volts, a reverse current up to 20 milliamps, and a power output of up to 20 milliwatts.

The solar panel orientation system 101 may be powered by radiation that penetrates through cloud cover. Use of the solar panel orientation system 101 may improve conversion of sunlight to electricity by approximately 40%. The solar panel orientation system 101 may be powered by sunlight that is received by a rear surface of the solar panel. Electricity generated by the reverse surface of a 65 watt solar panel is used by the solar panel orientation system 101 to rotate the solar panel into a forward facing orientation to improve an efficiency of solar power conversion.

Figure 2:
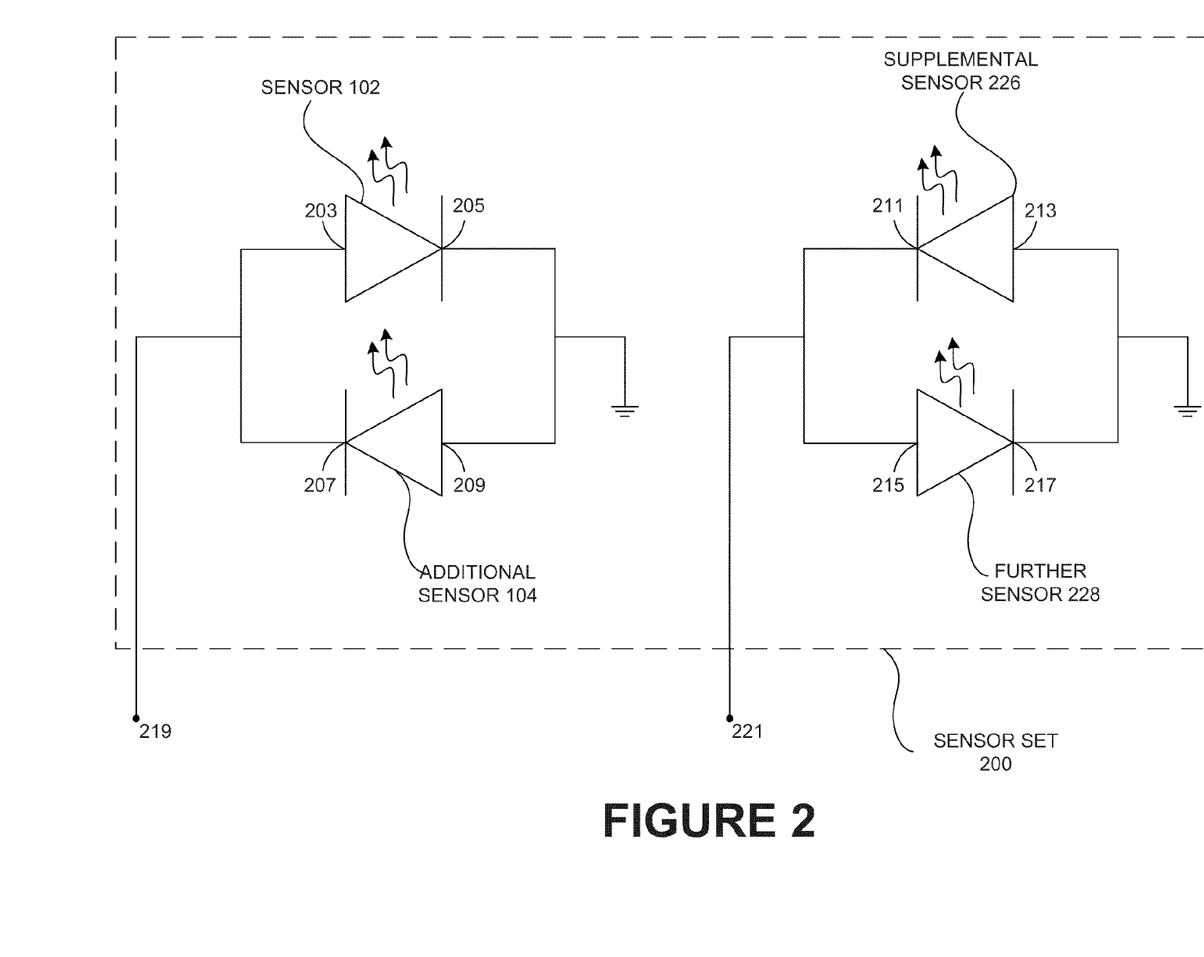
FIG. 2 illustrates a sensor set of a solar panel orientation system, according to an embodiment.

FIG. 2 illustrates a sensor set 200 of a solar panel orientation system 101, according to an embodiment. FIG. 2 includes the sensor 102, the additional sensor 104, a sensor set 200, anode 203, cathode 205, cathode 207, anode 209, cathode 211, anode 213, anode 215, cathode 217, a terminal 219, a terminal 221, a supplemental sensor 226, and a further sensor 228. The sensor set 200 includes the sensor 102, the additional sensor 104, the supplemental sensor 226, and the further sensor 228. The sensor set 200 may illustrate the components of the sensor set 100 of FIG. 1 and the azimuth sensor set 332, the altitude sensor set 334, and the rearward sensor set 336 of FIG. 3. The sensor set 200 may similarly be included within the multiple sensor sets 588 of FIG. 5.

In an embodiment, each of the sensors of the sensor set 200 are composed of a ultraviolet light emitting diode, which may be a surface mount type light emitting diode to conserve space. As illustrated, the anode 203 of the sensor 102 is coupled to the cathode 207 of the additional sensor 104 and the terminal 219. The cathode 211 of the supplemental sensor 226, the anode 215 of the further sensor 228, and the terminal 221 are coupled together. The cathode 205, the anode 209, the anode 213, and the cathode 217 are coupled to ground.

When the additional sensor 104 receives more ultraviolet radiation than the sensor 102, an error voltage or current is generated that is amplified to drive a DC motor that orients the solar panel orientation system 101 towards a source of the radiation signal 110. A positive error voltage or current of the sensor 102 and the additional sensor 104 is used to drive a DC motor in one direction. A positive error voltage of an additional pair of ultraviolet light emitting diodes that includes the supplemental sensor 226 and the further sensor 228 is used to drive the DC motor in the opposite direction.

The sensor 102 is parallel to the additional sensor 104, and the light emitting diodes are oriented in opposite directions. The supplemental sensor 226 is aligned in substantially the same direction as the additional sensor 104, and the further sensor 228 is aligned in substantially the same direction as the sensor 102.

As illustrated in FIG. 1, the sensors of the sensor set 200 are mounted at an angle Θ to a mounting surface 122. The angle Θ may be substantially at 45 degrees. The sensor may be weather protected by encapsulating the sensor set 200 within an injection molded polyurethane package that is molded to fit on top of the sensors. The polyurethane package may form the infrared filter 106, and it may be resistant to damage by ultraviolet radiation. In the embodiment, the polyurethane package includes a fisheye dome form as illustrated in FIG. 1 that enables a radiation source 108 to be located within an expanded viewing angle of each of the sensors of the sensor set 200. The expanded viewing angle may be up to 180 degrees, but multiple expanded viewing angles may be used.

The fisheye dome may have a hemispherical dome shape, or it may have a different lens shape that distorts incoming radiation to fit within a smaller viewing angle in accordance with a mapping function, such as gnomonical or perspective, linear scaled equidistant, orthographic, equal area, or stereographic.

Figure 3:
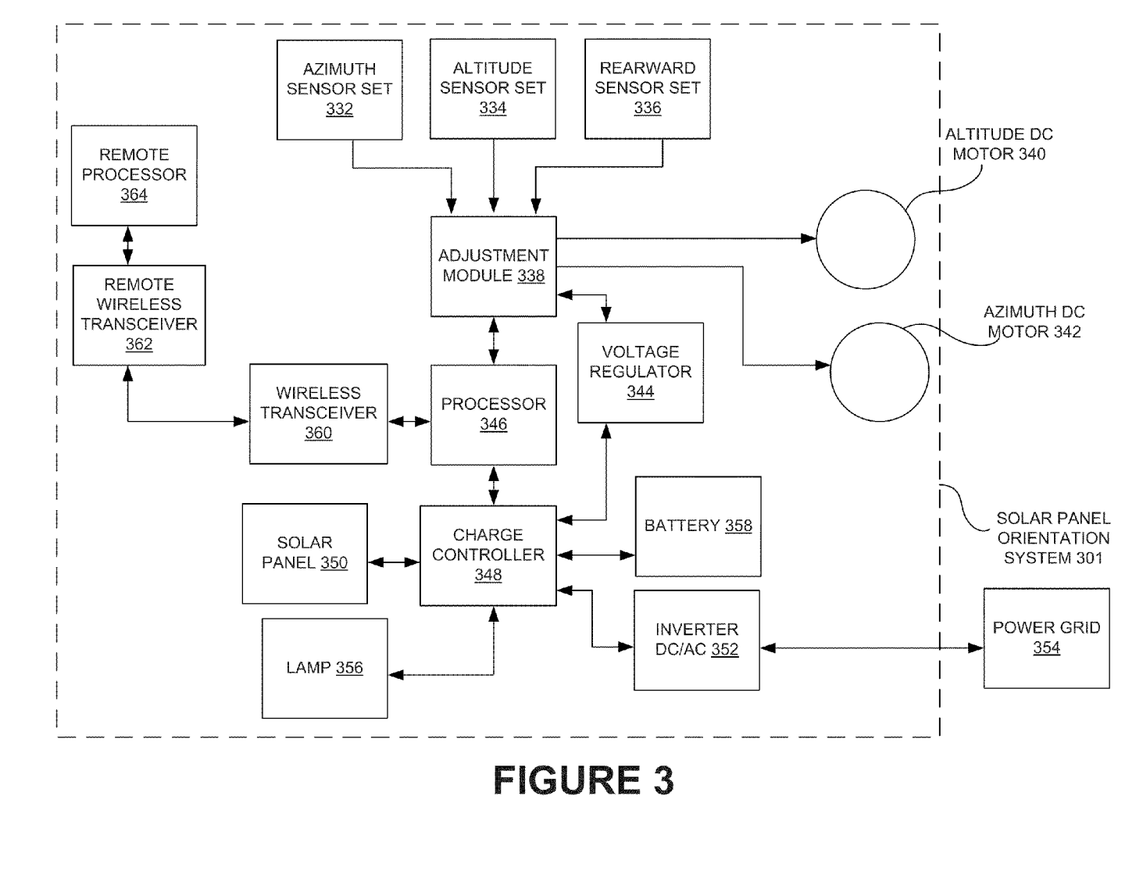
FIG. 3 illustrates a solar panel orientation system with an azimuth sensor set, an altitude sensor set, and a rearward sensor set, according to an embodiment.

FIG. 3 illustrates a solar panel orientation system 301 with an azimuth sensor set 332, an altitude sensor set 334, and a rearward sensor set 336, according to an embodiment. FIG. 3 includes an azimuth sensor set 332, an altitude sensor set 334, a rearward sensor set 336, an adjustment module 338, an altitude DC motor 340, an azimuth DC motor 342, a voltage regulator 344, a processor 346, a charge controller 348, a solar panel 350, an inverter DC/AC 352, a power grid 354, a lamp 356, a battery 358, a wireless transceiver 360, a remote wireless transceiver 362, and a remote processor 364.

In an embodiment, the adjustment module 338 is coupled to the azimuth sensor set 332, an altitude sensor set 334, a rearward sensor set, an altitude DC motor 340, an azimuth DC motor 342, a voltage regulator 344, and a processor 346. The processor 346 is coupled to a wireless transceiver 360 and a charge controller 348. The charge controller 348 is coupled to the solar panel 350, the lamp 356, the voltage regulator 344, the battery 358, and the inverter DC/AC 352. The inverter DC/AC 352 is coupled to the power grid 354.

In an embodiment, the solar panel orientation system 301 includes an adjustment module 338 that generates a motor signal based on the combined control signal 120, which is generated by merging the control signal component 116 and the additional control signal component 118. The motor signal rotates a solar panel in a direction around an axis, which may be parallel to either the horizontal support 690 or the vertical support 692. Rotation of the motor in the opposite direction is controlled by an additional motor signal that is generated from an additional combined control signal. The additional combined control signal 120 includes the output of the supplemental sensor 226 and the further sensor 228. The motor may be either the altitude DC motor 340 or the azimuth DC motor 342. The operation of an additional embodiment of the adjustment module 338 is further described with respect to FIG. 4.

The voltage regulator 344 may provide components of the solar panel orientation system 301 with voltage levels compatible with transistor-transistor logic circuitry (TTL) to operate logic gates and transistors. The charge controller 348 may charge an external or internal battery 358 to operate the solar panel orientation system 301 when solar power is unavailable. The charge controller 348 may disconnect the battery 358 from the solar panel 350 or a power grid 354 when the battery 358 is sufficiently charged. The charge controller 348 may also activate and deactivate a street lamp or other light after dark or in low light conditions.

The charge controller 348 may be coupled to the power grid 354 through an inverter DC/AC 352. The inverter DC/AC 352 may convert DC power from the solar panel 350 to AC power to supply to the power grid 354, or it may convert AC power from the power grid 354 to DC power to operate the solar panel orientation system 301 or charge the battery 358.

A processor 346 may be used to regulate and control the operations of the adjustment module 338, the altitude DC motor 340 and the azimuth DC motor 342, the voltage regulator 344 and the charge controller 348. In an additional embodiment, the operation of the processor 346 is further described with respect to FIG. 4.

In an embodiment, the solar panel orientation system 301 includes a wireless transceiver 360. The wireless transceiver 360 may be used to communicate with a remote wireless transceiver 362 and a remote processor 364 using IEEE 802.15, Zigbee, Bluetooth, or any other wireless standard. Each solar panel orientation system 301 may include an internet protocol address. The remote processor 364 may be used to to monitor or control the lamp 356 and the solar panel orientation system 301. A field maintenance crew may determine whether the solar panel orientation system 301 is in need of repair or optimization using the remote processor 364.

Figure 4:
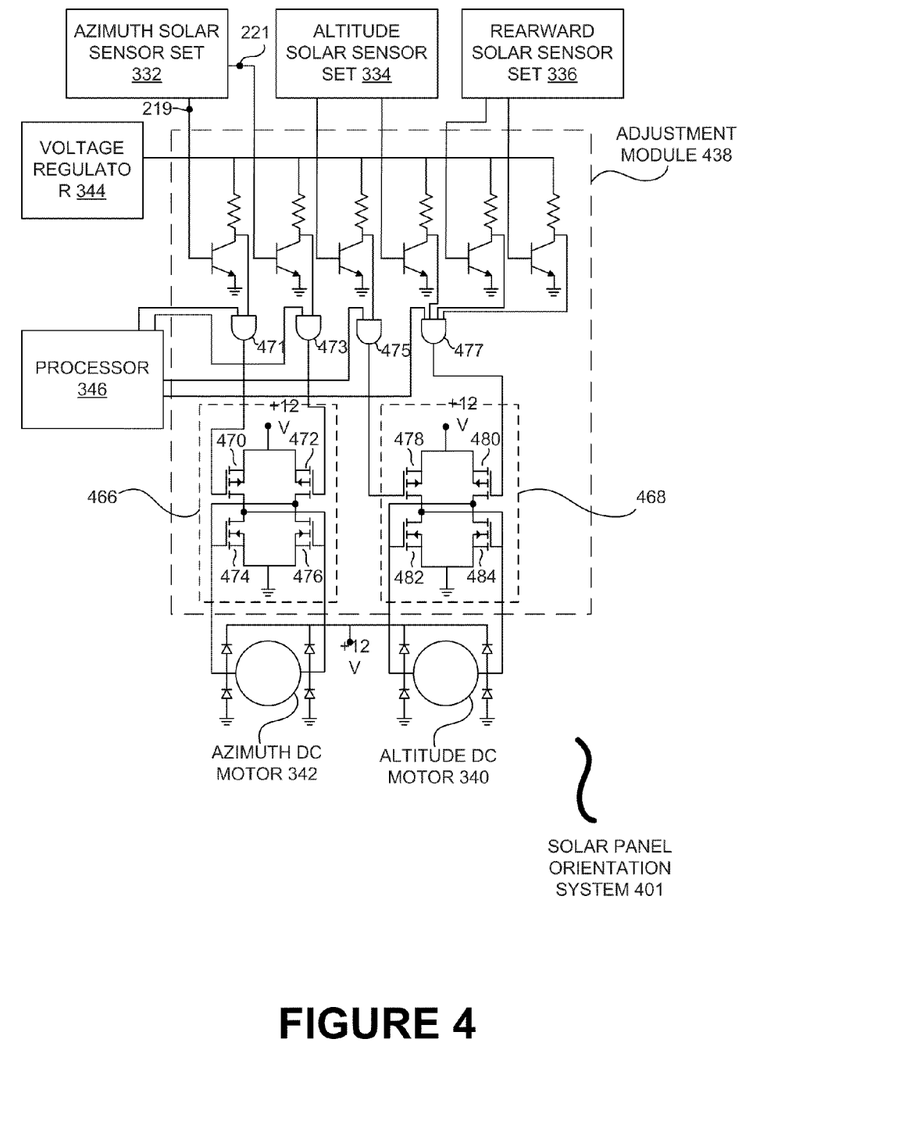
FIG. 4 illustrates an adjustment module of the solar panel orientation system, according to an additional embodiment.

FIG. 4 illustrates an adjustment module 438 of the solar panel orientation system 401, according to an additional embodiment. FIG. 4 includes the azimuth solar sensor set 332, the altitude solar sensor set 334, the rearward solar sensor 336, the altitude DC motor 340, the azimuth DC motor 342, the voltage regulator 344, the processor 346, a solar panel orientation system 401, an adjustment module 438, P-channel mosfets 470, 472, 478, and 480, N-channel mosfets 474, 476, 482, and 484, H bridges 466 and 468, as well as AND logic gates 471, 473, 475, and 477. H bridge 466 includes P-channel mosfets 470 and 472 and N-channel mosfets 474 and 476. H bridge 468 includes P-channel mosfets 478 and 480 and N-channel mosfets 482 and 484.

The azimuth solar sensor set 332, the altitude solar sensor set 334, and the rearward solar sensor 336 each include four ultraviolet light emitting diodes. The mounting surfaces 122 of the azimuth solar sensor set 332, the altitude solar sensor set 334, and the rearward solar sensor set 336 may be parallel. The sensors of the of the altitude solar sensor set 334 may be rotated 90 degrees from the orientation of the sensors of the azimuth solar sensor set 332 within a plane parallel to the mounting surface 122 and the surface of the solar panel 350. The rearward solar sensor set 336 may face in an opposite direction from the direction viewed by the azimuth solar sensor set 332 and the altitude solar sensor set 334.

The azimuth sensor set 332 is coupled to terminals 219 and 221. If the azimuth solar sensor set 332 is not oriented such that the mounting surface 122 is perpendicular to the sun while receiving sunlight, a positive error voltage of approximately 1.5 volts may be generated by sensor 102 and the additional sensor 104 that turns on an NPN transistor coupled to terminal 219. This may raise an input of the AND logic gate 471 coupled to the NPN transistor to a logic "0," which may turn on P-channel mosfet 470 and N-channel mosfet 474. H bridge 466 may in this way drive the coupled azimuth DC motor 342 in one direction.

Alternatively, the supplemental sensor 226 and the further sensor 228 coupled to terminal 221 may generate a positive voltage that turns on a coupled NPN transistor. The NPN transistor may raise an input of the AND logic gate 473 to a logic "0," which may in turn on P-channel mosfet 472 and N-channel mosfet 476. H bridge 466 may thus drive the coupled azimuth DC motor 342 in a reverse direction.

Each pair of a P-channel mosfet and an N-channel mosfet may be used to drive a coupled motor in one direction, and the H bridge 468 may be driven in a similar way by the altitude solar sensor set 334 coupled to AND logic gates 475 and 477. For example, P-channel mosfet 478 and N-channel mosfet 482 may be activated to drive the altitude DC motor 340 in a forward direction, while P-channel mosfet 480 and N-channel mosfet 484 may be activated to drive the altitude DC motor 340 in a reverse direction.

When the rearward solar sensor set 336 is exposed to a radiation signal 110 such as sunlight, a positive voltage is generated that activates an NPN transistor coupled to AND logic gate 477, which may drive the altitude DC motor 340 in the reverse direction. The rearward facing sensor set 336 may be used to reset the solar panel 350 when a rear face of the solar panel 350 is oriented towards the sun. Accordingly, two terminals of the rearward facing sensor set 336 may be used to drive the altitude DC motor 340 in the reverse direction.

Protective diodes may be coupled to the input terminals of the altitude DC motor 340 and the azimuth DC motor 342 to prevent back voltage from the motors from damaging the connected components of the solar panel orientation system 401.

The processor 346 is coupled to AND logic gates 471, 473, 475, and 477, and may be used to directly control the rotation of azimuth DC motor 342 and altitude DC motor 340 by raising or lowering the logic level of the input of the appropriate AND logic gate. The processor 346 may therefore park the solar panel orientation system 401 when solar power is unavailable.

Figure 5:
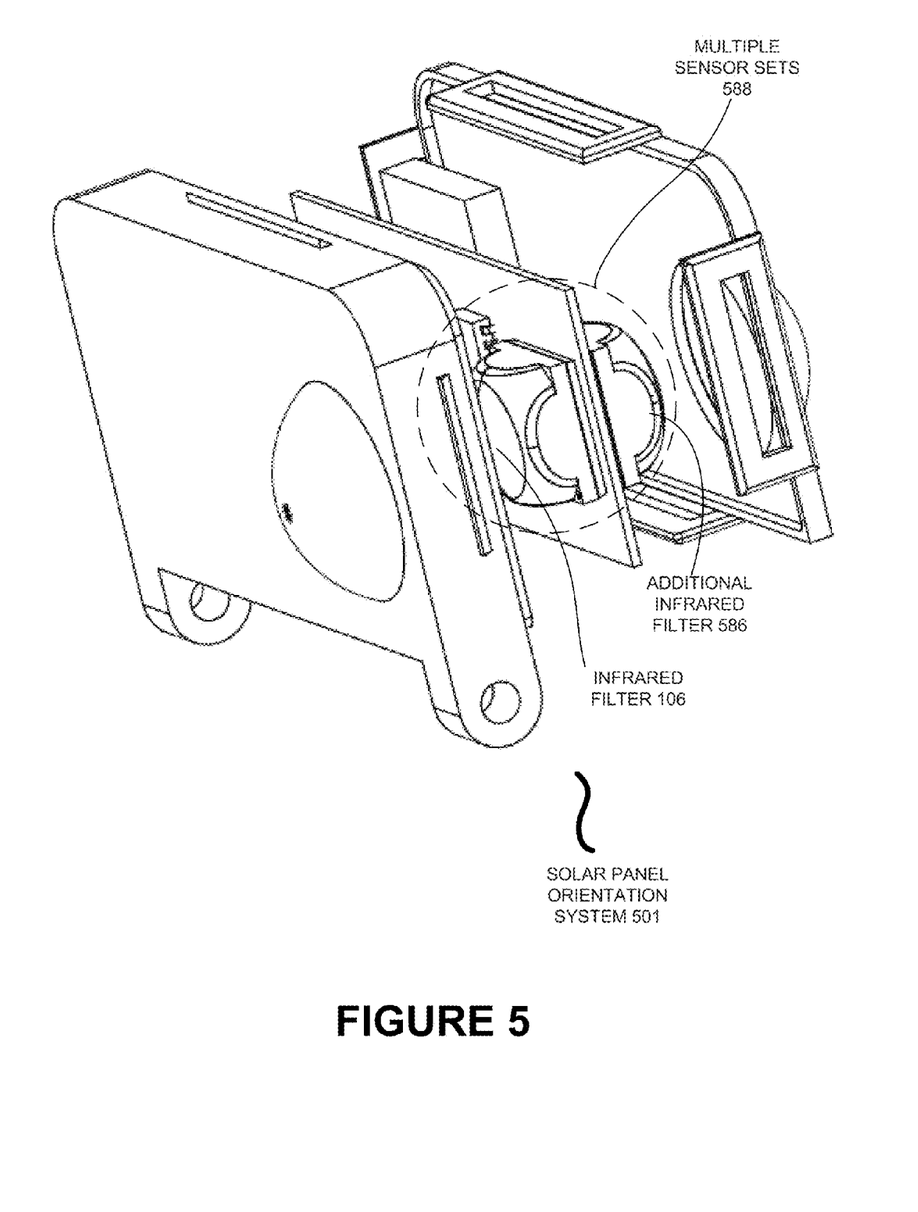
FIG. 5 illustrates a solar panel orientation system with multiple sensor sets, according to one embodiment.

FIG. 5 illustrates a solar panel orientation system 501 with multiple sensor sets 588, according to one embodiment. FIG. 5 includes an infrared filter 106, a solar panel orientation system 501, an additional infrared filter 586, and multiple sensor sets 588. In an embodiment, the infrared filter 106 shields an altitude solar sensor set 332 and an azimuth solar sensor set 334 mounted to a printed circuit board of the solar panel orientation system 501. The additional infrared filter 586 covers a rearward sensor set 336 mounted to an opposite face of the printed circuit board, which allows the sensors to receive radiation signals from the opposite direction of the sensors covered by the infrared filter 106.

Figure 6:
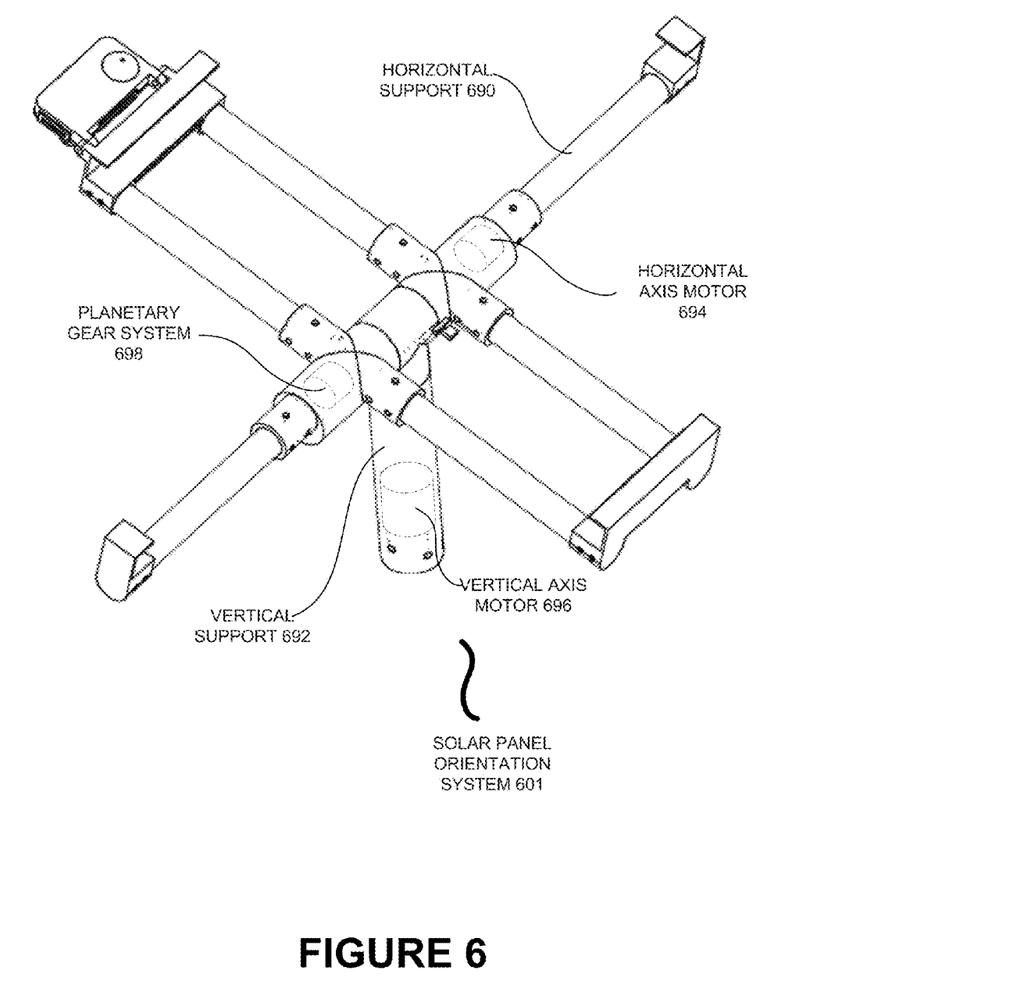
FIG. 6 illustrates a solar panel orientation system with a horizontal support and a vertical support in an additional embodiment.

FIG. 6 illustrates a solar panel orientation system 601 with a horizontal support 690 and a vertical support 692 in an additional embodiment. FIG. 6 includes a solar panel orientation system 601, a horizontal support 690, a vertical support 692, a horizontal axis motor 694, a vertical axis motor 696, and a planetary gear system 698.

A solar panel 350 may be secured to the horizontal support 690 and the vertical support 692 of the solar panel orientation system 601. In an embodiment, the vertical support 692 and the horizontal support 690 may be cylindrical supports designed to support the weight of the solar panel orientation system 601 and a solar panel 350. The horizontal support 690 and the vertical support 692 may support other structures and devices, such as a light for a street lamp.

The horizontal support 690 and the vertical support 692 may be constructed of metal, and they may be assembled and disassembled for mobile applications. For example, the horizontal support 690 and the vertical support 692 and other components of the solar panel orientation system 601 may be designed to separate into pieces that may be carried by an individual to assist with installation of a solar panel 350 in remote regions lacking regular electricity supply.

In an embodiment, the horizontal axis motor 694 is enclosed within the horizontal support 690 and the vertical axis motor 696 is enclosed within the vertical support 692. Securing the horizontal axis motor 694 and the vertical axis motor 696 within the horizontal support 690 and the vertical support 692 may protect the motors from theft, vandalism, and weather damage. In addition, securing the horizontal axis motor 694 and the vertical axis motor 696 within the horizontal and vertical supports may reduce a number of steps needed to install the solar panel orientation system 601 by an end user.

The horizontal axis motor 694 rotates the solar panel orientation system 601 around the horizontal support 690 to track an altitude angle of a source of radiation, and the vertical axis motor 696 rotates the solar panel orientation system 601 around the vertical support 692 to track an azimuth angle of the source of radiation.

In an embodiment, one or both of the horizontal support 690 and the vertical support 692 may include a planetary gear system 698, which may be mechanically coupled to either the vertical axis motor 696 or the horizontal axis motor 694. The planetary gear system 698 may be coupled to a motor with a 100 to 1 gear ratio, allowing a motor turning at 2400 rpm to rotate a system at 24 rpm. Multiple other gear ratios may be used. Including the planetary gear system 698 within either the horizontal support 690 or the vertical support 692 may allow the motors and planetary gear system 698 of the solar panel orientation system 601 to be coupled and aligned with a limited number of tools. Enclosing the planetary gear system 698 within the horizontal support 690 or the vertical support 692 may also protect the planetary gear system 698 from vandalism, theft, weather damage, and impact damage. The planetary gear system 698 may use a 95 degree tooth angle to reduce the energy required to rotate the solar panel orientation system 601.

A shaft of the planetary gear system 698 may be inserted into a semi-circular hole embedded in a cylindrical section of the horizontal support 690 or the vertical support 692. The semi-circular hole enables the shaft to generate a resistance to rotate the solar panel orientation system 601 in an azimuth or an altitude direction.

The end of the cylindrical section may slide against and rotate with respect to a mating face of the horizontal support 690 or vertical support 692 to form a sliding joint. This sliding connection between the cylindrical section and the horizontal support 690 or vertical support 692 may reduce water and air flow into the supports for the solar panel orientation system 601 from rain or wind. The planetary gear system 698 may be adjustable to alter the gear ratio of the solar panel orientation system 601.

In an embodiment, the solar panel orientation system 601 rotates the solar panel 350 through 360 degrees in an azimuth direction and through 90 degrees in an altitude direction. As the panel rotates towards 90 degrees, a limit switch may cut off motor operation to prevent the panel from rotating past 90 degrees in the altitude direction, but the panel may be lowered back down to 0 degrees of altitude to orient the solar panel 350 towards the sun as it sets. Similarly, an additional limit switch may prevent the solar panel 350 from being rotated past 0 degrees of elevation to prevent the solar panel 350 from contacting supporting structures.

In another embodiment, a photovoltaic junction panel coupled to the processor 346 prevents the solar panel 350 from forming a high resistance path through a partially shaded solar panel 350. The photovoltaic junction panel uses a bypass diode to provide a lower resistance current path to prevent the solar panel 350 from overheating. The voltage level of the components of the solar panel 350 may be monitored using the remote processor 364 and wireless communication between the remote wireless transceiver 362 and the wireless transceiver 360.

The solar panel orientation system 601 may include a wind speed detector that rotates the solar panel 350 parallel to the ground to reduce its wind resistance when wind speeds in excess of 150 kilometers per hour are encountered. The solar panel orientation system 601 may support the panel in other orientations in wind speeds up to 150 kilometers per hour.

The solar panel orientation system 601 may include a fault detection mode in which a panel that has had an activated bypass diode for more than 12 hours will generate an alert requesting maintenance. The alert may be received by the remote processor 364. The solar panel orientation system 601 may also include a temperature sensor to detect overheating conditions that may be communicated to a monitoring station. The solar panel orientation system 601 may also include a lightning grounding line to reduce damage to the solar panel orientation system 601 in the event of a lightning strike.

The supporting structure of the solar panel orientation system 601 may support eight solar panels 350, each weighing 15 kilograms. The total power generated by the system may be approximately 1 kilowatt, and the battery 358 may be charged by a single panel or rapidly charged by multiple solar panels 350 connected to the battery 358 in parallel. Any excess current generated by the solar panels 350 may be provided to the power grid 354.

In an embodiment, the solar panel orientation system 601 includes a wireless transceiver 360 based on an 802.15.4 communication protocol using a mesh topology. Each one of several solar panel orientation systems 601 equipped with a wireless transceiver 360 may act as a transmit node or a relay node. If a base station is unable to receive a signal from a transmitting node, the other solar panel orientation systems 601 in the mesh topology may relay data from the transmitting node. The data may include solar panel 350 voltage levels, wind speed, and solar panel 350 temperatures.

Figure 7:
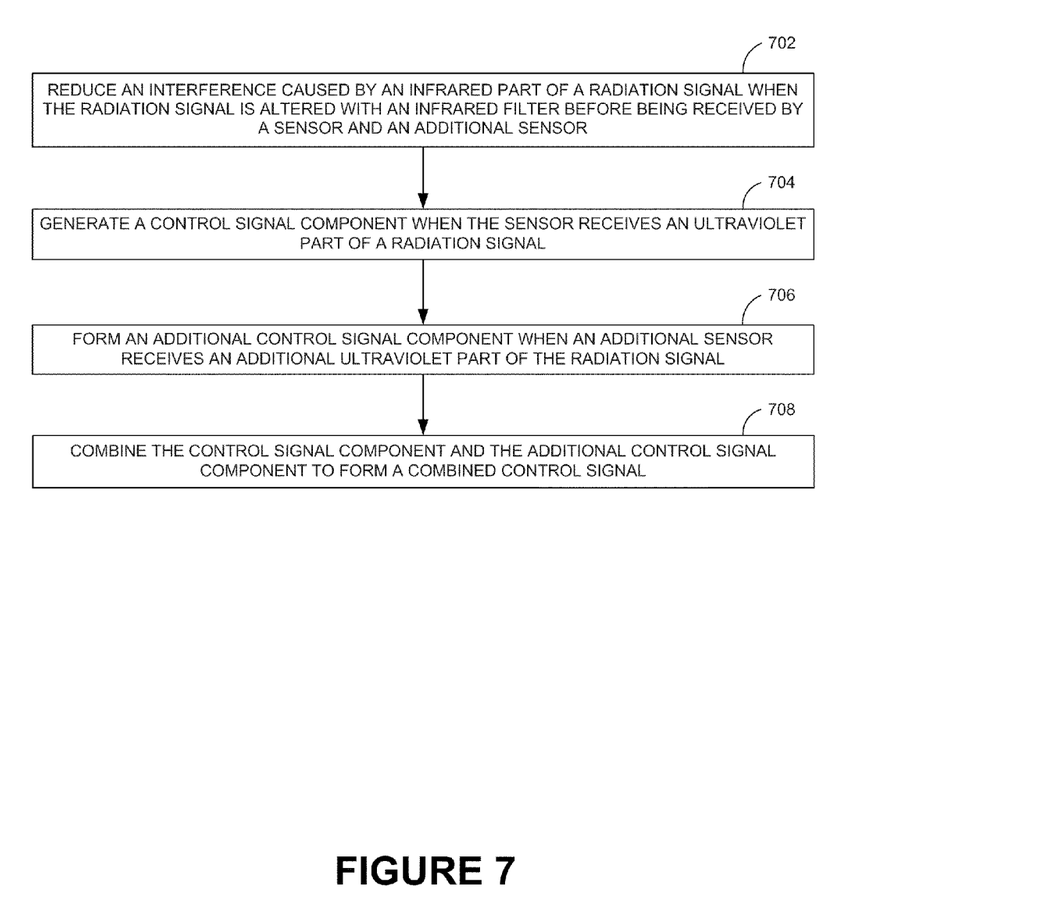
FIG. 7 illustrates a process flow to reduce an interference caused by an infrared part of a radiation signal, according to one embodiment.

FIG. 7 illustrates a process flow to reduce an interference caused by an infrared part of a radiation signal 110, according to one embodiment. In operation 702, an interference caused by an infrared part of a radiation signal 110 is reduced when the radiation signal 110 is altered with an infrared filter 106 before being received by a sensor 102 and an additional sensor 104. The infrared filter 106 may reduce a distortion of the portions of the radiation signal 110 that are received by the sensor 102 and the additional sensor 104, which may increase an accuracy of solar panel orientation system 101. The infrared filter 106 may reduce infrared distortion by approximately 80% while reducing ultraviolet signals by approximately 5%.

In operation 704, a control signal component is generated when the sensor 102 receives an ultraviolet part of a radiation signal 110. The portion of the radiation signal 110 received by the sensor 102 may depend on the mounting angle of the sensor 102 to the mounting surface 122, the incoming angle of the radiation signal 110, the portion of the infrared filter 106 that the radiation signal 110 passes through, the type of material used in the infrared filter 106, and other factors. The control signal component 116 may be a voltage or a current generated by an ultraviolet light emitting diode of the sensor 102 that receives the ultraviolet signal 112.

In operation 706, an additional control signal component 118 is formed when an additional sensor 104 receives an additional ultraviolet part of the radiation signal 110. The additional control signal component 118 may be a voltage or current formed by an ultraviolet light emitting diode of the additional sensor 104 when it receives the additional ultraviolet signal 114.

In operation 708, combine the control signal component 116 and the additional control signal component 118 to form a combined control signal 120. The combined control signal 120 may be an error difference between the voltage or current generated by the sensor 102 and the additional sensor 104. The combined control signal 120 may be amplified and used to operate a motor to orient the solar panel 350 until the mounting surface 122 is substantially perpendicular to the source of radiation 108.

Figure 8:
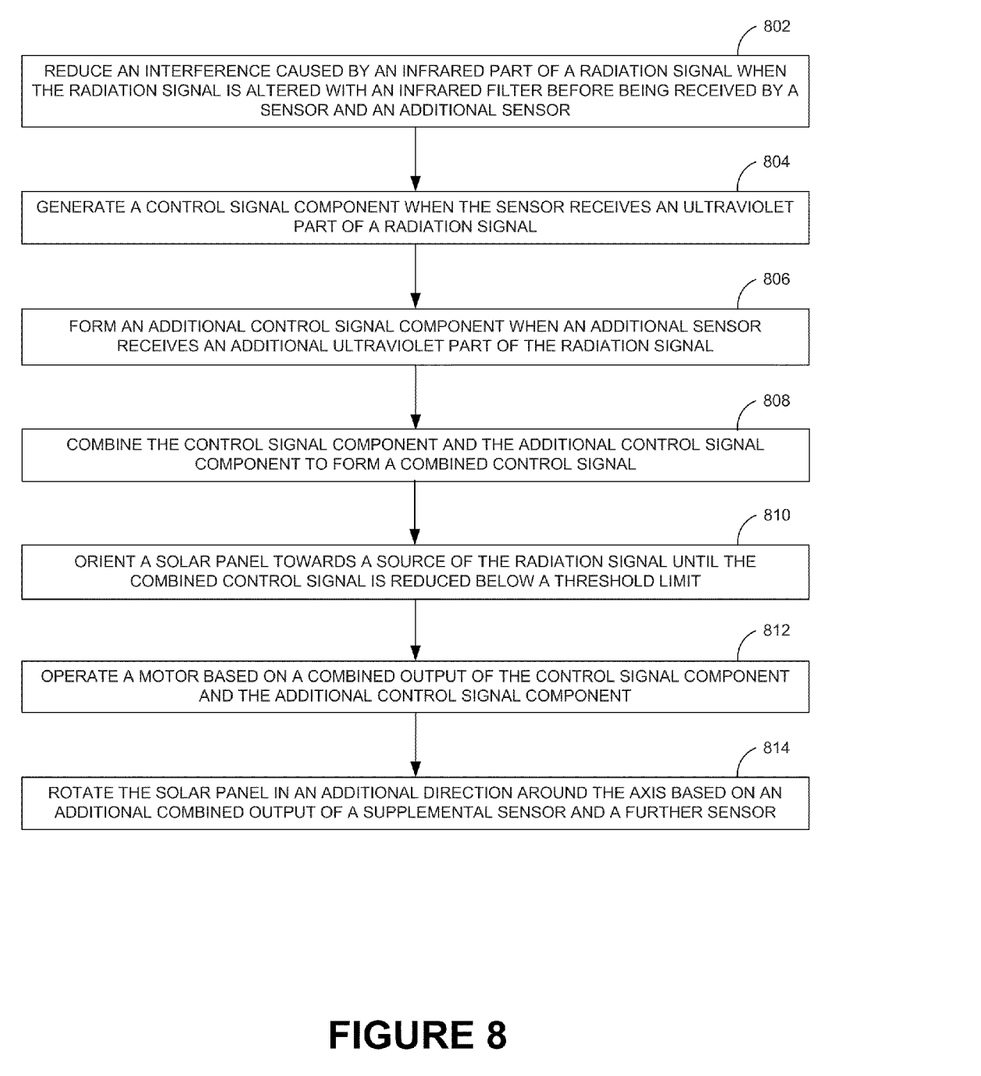
FIG. 8 illustrates a process flow to orient a solar panel towards a source of a radiation signal, according to one embodiment.

FIG. 8 illustrates a process flow to orient a solar panel 350 towards a source 108 of a radiation signal 110, according to one embodiment. In operation 802, an interference caused by an infrared part of a radiation signal 110 is reduced when the radiation signal 110 is altered with an infrared filter 106 before being received by a sensor 102 and an additional sensor 104. In operation 804, a control signal component 116 is generated when the sensor 102 receives an ultraviolet part of a radiation signal 110. In operation 806, an additional control signal component 118 is formed when an additional sensor 104 receives an additional ultraviolet part of the radiation signal 110. In operation 808, the control signal component 116 and the additional control signal component 118 are combined to form a combined control signal 120.

In operation 810, a solar panel 350 is oriented towards a source 108 of the radiation signal 110 until the combined control signal 120 is reduced below a threshold limit. The threshold limit may be a voltage or current level of the combined control signal 120 that generates a motor torque that is statically balanced against the weight of the solar panel 350 and the static frictional resistance of the solar panel orientation system 101. In operation 812, a motor is operated based on a combined output of the control signal component 116 and the additional control signal component 118. In operation 814, the solar panel 350 is rotated in an additional direction around the axis based on an additional combined output of a supplemental sensor 226 and a further sensor 228.

In an embodiment, the additional direction is the opposite rotational direction of the solar panel 350. For example, the error signal of the sensor 102 and the additional sensor 104 may be used to rotate the solar panel 350 clockwise around a vertical axis of the solar panel orientation system 601. Rotating the solar panel 350 may also rotate the sensor set 100. The additional direction may be counter-clockwise, and the error signal generated by the supplemental sensor 226 and the further sensor 228 may be the additional combined output.

Figure 9:
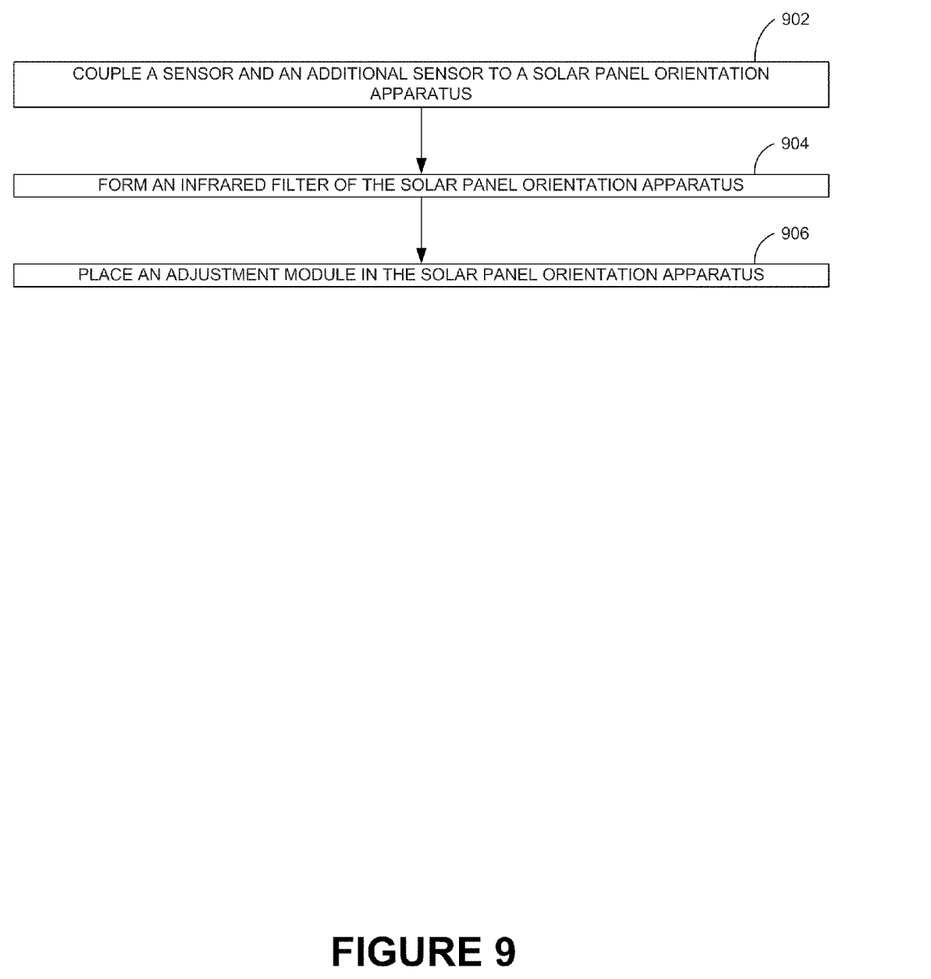
FIG. 9 illustrates a process flow to form an infrared filter of the solar panel orientation system, according to one embodiment.

FIG. 9 illustrates a process flow to form an infrared filter 106 of the solar panel orientation system 101, according to one embodiment. In operation 902, a sensor 102 and an additional sensor 104 are coupled to a solar panel orientation system 101. In operation 904, an infrared filter 106 of the solar panel orientation system 101 is formed. The infrared filter 106 may be made up of a polyurethane material that is injection molded with a dome shaped exterior and an interior face molded to fit against the sensor set 100. The infrared filter 106 may be attached to the mounting surface 122. In operation 906, an adjustment module 338 is placed in the solar panel orientation system 601. In an embodiment, the adjustment module 338 is made up of AND logic gates 471, 473, 475, and 477, H bridges 466 and 468, and P-channel mosfets 470, 472, 478, and 480, N-channel mosfets 474, 476, 482, and 484.

Figure 10:
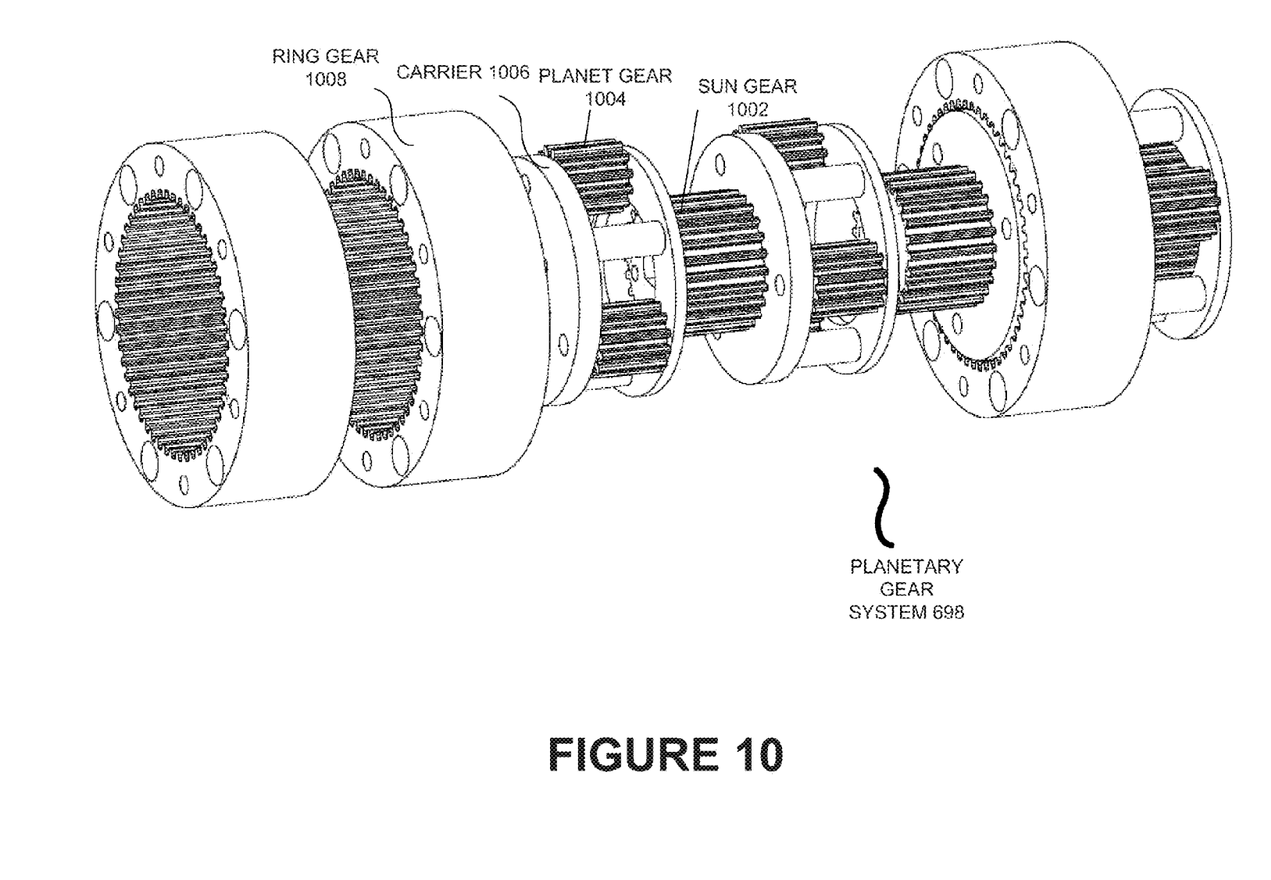
FIG. 10 is an exploded view of a planetary gear system, according to one embodiment.

FIG. 10 is an exploded view of a planetary gear system 698, according to one embodiment. The planetary gear system 698 may include a sun gear 1002, a planet gear 1004, a carrier 1006, and a ring gear 1008. The axis of the sun gear 1002, the carrier 1006, and the ring gear 1008 of the planetary gear system 698 may be the central axis of the horizontal support 690 or the vertical support 692. The planet gear 1004 of the planetary gear system 698 may be attached to a carrier 1006 that revolves around the central axis of the horizontal support 690 or the vertical support 692. The planet gear 1004 and the sun gear 1002 may mesh together. The ring gear 1008 and the planet gear 1004 may also mesh together.

Each component of the planetary gear system 698, including the sun gear 1002, the planet gear 1004, the carrier 1006, and the ring gear 1008 may be connected to a driving motive force, an output, or held stationary. Various gear ratios may be achieved by altering which component of the planetary gear system 698 is coupled to an input, an output, or is mechanically coupled to the movement of another component of the planetary gear system 698.

Although the disclosures have been made in the context of certain embodiments and examples, it will be understood by those skilled in the art that the invention extends beyond the specifically disclosed embodiments to other alternative embodiments and/or uses and obvious modifications and equivalents. Accordingly, the invention is not intended to be limited by the specific disclosures of preferred embodiments herein. It will further be understood by those skilled in the art that the various operations, processes, and methods may be embodied in a machine-readable medium and performed using a computer process.

What is claimed is:

1. A solar panel orientation system, comprising:
   a sensor that generates a control signal component when the sensor receives an ultraviolet part of a radiation signal;
   an additional sensor coupled to the sensor that generates an additional control signal component when the additional sensor receives an additional ultraviolet part of the radiation signal, wherein the control signal component and the additional control signal component are each comprised of at least one of a voltage and a current; and an infrared filter that reduces an interference caused by an infrared part of the radiation signal, wherein the interference is reduced when the infrared part of the radiation signal is diminished by the infrared filter before the radiation signal is received by the sensor and the additional sensor.

2. The system of claim 1, wherein a solar panel is oriented towards a source of the radiation signal until the combined control signal of the control signal component and the additional control component is reduced below a threshold limit, and wherein the threshold limit is reached when a mounting surface of the sensor and the additional sensor is substantially perpendicular to a source of the radiation signal.

3. The system of claim 2, wherein the sensor and the additional sensor are each comprised of a light emitting diode.

4. The system of claim 3, wherein the infrared filter is comprised of a polyurethane dome that includes a fish eye that expands the viewing angle of the sensor shielded by the infrared filter.

5. The system of claim 1, further comprising:
an adjustment module that generates a motor signal based on a combined output of the control signal component and the additional control signal component, wherein the motor signal rotates a solar panel in a direction around an axis.

6. The system of claim 5, further comprising:
a supplemental sensor; and
a further sensor, wherein the supplemental sensor and the further sensor are coupled together, and wherein an additional combined output of the supplemental sensor and the further sensor provides the basis of an additional motor signal that rotates the solar panel in an additional direction around the axis.

7. The system of claim 6, further comprising:
an additional sensor set comprised of four ultraviolet sensors used to rotate the solar panel around an additional axis to orient a solar panel towards a source of the radiation signal, wherein the additional axis is perpendicular to the axis, and wherein the sensor, the additional sensor, the supplemental sensor, and the further sensor are each attached to a mounting surface at a predetermined angle.

8. The system of claim 7, further comprising:
a rearward sensor that receives an additional radiation signal that is directed towards a rear surface of a solar panel, wherein the rearward sensor is used to orient the solar panel towards an additional source of the additional radiation signal when the rearward sensor receives the part of the additional radiation signal.

9. The system of claim 8, wherein the sensor, the additional sensor, the supplemental sensor, and the further sensor each detect ultraviolet radiation with wavelengths substantially between 390 nanometers and 400 nanometers, a sensor anode being coupled to an additional sensor cathode and a sensor cathode being connected to an additional sensor anode.

10. The system of claim 8, wherein the infrared filter is comprised of polyurethane that is between 2.0 and 3.0 millimeters in thickness.

11. The system of claim 8, further comprising:
a vertical support of the solar panel orientation system;
a horizontal support of the solar panel orientation system;
a vertical axis motor enclosed within the vertical support; and
a horizontal axis motor enclosed within the horizontal support.

12. The system of claim 11, wherein the adjustment module is comprised of an H bridge comprised of two P channel mosfets and two N channel mosfets, wherein the H bridge rotates at least one of the horizontal axis motor and the vertical axis motor when at least one of the combined signal and the additional combined signal is received.

13. A method of a solar panel orientation system, comprising:
reducing an interference caused by an infrared part of a radiation signal when the radiation signal is altered with an infrared filter before the radiation signal is received by a sensor and an additional sensor;
generating a control signal component when the sensor receives an ultraviolet part of a radiation signal;
forming an additional control signal component when an additional sensor receives an additional ultraviolet part of the radiation signal; and
combining the control signal component and the additional control signal component to form a combined control signal.

14. The method of claim 13, further comprising:
orienting a solar panel towards a source of the radiation signal until the combined control signal is reduced below a threshold limit.

15. The method of claim 14, wherein the sensor and the additional sensor are each comprised of a light emitting diode.

16. The method of claim 15, wherein the infrared filter is comprised of a polyurethane dome.

17. The method of claim 13, further comprising:
operating a motor based on a combined output of the control signal component and the additional control signal component, wherein a solar panel is rotated in a direction around an axis based on the combined output.

18. The method of claim 17, further comprising:
rotating the solar panel in an additional direction around the axis based on an additional combined output of a supplemental sensor and a further sensor.

19. A method of a solar panel orientation system, comprising:
coupling a sensor and an additional sensor to a solar panel orientation system, wherein the sensor generates a control signal component when the sensor receives an ultraviolet part of a radiation signal, and wherein the additional sensor generates an additional control signal component when the additional sensor receives an additional ultraviolet part of the radiation signal, wherein the control signal component and the additional control signal component are each comprised of at least one of a voltage and a current;
forming an infrared filter of the solar panel orientation system, wherein the infrared filter reduces an interference caused by an infrared part of the radiation signal, wherein the interference is reduced when the infrared part of the radiation signal is diminished by the infrared filter before the radiation signal is received by the sensor and the additional sensor, the infrared filter being comprised of polyurethane between 2.0 and 3.0 millimeters in thickness;
placing an adjustment module in the solar panel orientation system, wherein the adjustment module generates a motor signal based on a combined output of the control signal component and the additional control signal component, and wherein the motor signal rotates a solar panel in a direction around an axis; and
coupling a supplemental sensor and a further sensor to the solar panel orientation system, wherein the supplemental sensor and the further sensor are coupled, and wherein an additional combined output of the supplemental sensor and the further sensor provides the basis of an additional motor signal that rotates the solar panel in an additional direction around the axis.

20. The method of claim 19, further comprising:

placing an additional sensor set in the solar panel orientation system, wherein the additional sensor set is comprised of four ultraviolet sensors used to rotate the solar panel around an additional axis to orient a solar panel towards a source of the radiation signal, the additional axis being perpendicular to the axis, and wherein a solar panel is oriented towards a source of the radiation signal until the combined control signal is reduced below a threshold limit, the threshold limit being reached when a mounting surface of the sensor and the additional sensor is substantially perpendicular to a source of the radiation signal; and coupling a rearward sensor to the solar panel orientation system, wherein the rearward sensor receives an additional radiation signal that is directed towards a rear surface of a solar panel, the rearward sensor being used to orient the solar panel towards an additional source of the additional radiation signal when the rearward sensor receives the part of the additional radiation signal, and wherein the sensor, the additional sensor, the supplemental sensor, and the further sensor each detect ultraviolet radiation with wavelengths substantially between 390 nanometers and 400 nanometers.

* * * * *